(12) United States Patent
Yang et al.

(10) Patent No.: US 9,078,252 B2
(45) Date of Patent: Jul. 7, 2015

(54) METHOD AND APPARATUS FOR TRANSMITTING CONTROL INFORMATION

(75) Inventors: Suckchel Yang, Anyang-si (KR); Joonkui Ahn, Anyang-si (KR); Dongyoun Seo, Anyang-si (KR); Mingyu Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 13/881,905

(22) PCT Filed: Oct. 26, 2011

(86) PCT No.: PCT/KR2011/008039
§ 371 (c)(1),
(2), (4) Date: Apr. 26, 2013

(87) PCT Pub. No.: WO2012/057526
PCT Pub. Date: May 3, 2012

(65) Prior Publication Data
US 2013/0215807 A1    Aug. 22, 2013

Related U.S. Application Data

(60) Provisional application No. 61/406,579, filed on Oct. 26, 2010.

(51) Int. Cl.
*H04W 80/04* (2009.01)
*H04W 88/06* (2009.01)
(Continued)

(52) U.S. Cl.
CPC ......... *H04W 72/0413* (2013.01); *H04L 1/0026* (2013.01); *H04L 1/0073* (2013.01); *H04L 1/06* (2013.01); *H04L 1/1671* (2013.01); *H04L 1/1692* (2013.01); *H04L 5/001* (2013.01);
(Continued)

(58) Field of Classification Search
CPC ..... H04W 80/04; H04W 88/06; H04W 28/04; H04W 72/04
USPC ................................................... 370/328, 329
See application file for complete search history.

(56) References Cited

U.S. PATENT DOCUMENTS

2013/0094410 A1*  4/2013  Yang et al. ................ 370/280
2013/0195066 A1*  8/2013  Lee et al. .................. 370/329

OTHER PUBLICATIONS

CATT, "DAI Design for LTE-A," 3GPP TSG RAN WG1 Meeting #62, R1-104311, Aug. 2010, 4 pages.
(Continued)

*Primary Examiner* — Ronald B Abelson
(74) *Attorney, Agent, or Firm* — Lee, Hong, Degerman, Kang & Waimey

(57) ABSTRACT

A method and apparatus for transmitting uplink control information in an FDD wireless communication system, in which a plurality of cells are arranged, are provided. The method includes: receiving one or more PDCCH signals and one or more PDSCH signals corresponding to the PDCCH signals in downlink subframe N; generating ACK/NACK information on the basis of the result of the acknowledgement of receipt of at least the one or more PDSCH signals; and transmitting the ACK/NACK information through a PUCCH. If a predetermined condition is satisfied, at least one of the PDCCH signals includes information indicating a DAI value, and if the predetermined condition is not satisfied, at least one of the PDCCH signals includes information indicating a value of a PUCCH resource for the ACK/NACK information. The information indicating the DAI value and the information indicating the value of the PUCCH resource are provided in the same field.

10 Claims, 17 Drawing Sheets

(51) Int. Cl.
*H04W 28/04* (2009.01)
*H04W 72/04* (2009.01)
*H04L 1/00* (2006.01)
*H04L 1/16* (2006.01)
*H04L 1/18* (2006.01)
*H04L 1/06* (2006.01)
*H04L 5/00* (2006.01)

(52) U.S. Cl.
CPC ............ *H04L5/0055* (2013.01); *H04L 1/0027* (2013.01); *H04L 1/1854* (2013.01); *H04L 5/0053* (2013.01); *H04L 5/0094* (2013.01); *H04W 72/042* (2013.01)

(56) References Cited

OTHER PUBLICATIONS

LG Electronics, "ACK/NACK resource allocation for FDD," 3GPP TSG RAN WG1 #62bis, R1-105339, Oct. 2010, 9 pages.
LG Electronics, "UL ACK/NACK bundling," 3GPP TSG RAN WG1 #62, R1-104642, Aug. 2010, 5 pages.
Samsung, "Need for DAI and HARQ-ACK Transmission Aspects with CA," 3GPP TSG RAN WG1 #62, R1-104576, Aug. 2010, 4 pages.
PCT International Application No. PCT/KR2011/008039, Written Opinion of the International Searching Authority dated Apr. 19, 2012, 16 pages.

* cited by examiner

METHOD AND APPARATUS FOR TRANSMITTING CONTROL INFORMATION

CROSS-REFERENCE TO RELATED APPLICATIONS

This application is the National Stage filing under 35 U.S.C. 371 of International Application No. PCT/KR2011/008039, filed on Oct. 26, 2011, which claims the benefit of U.S. Provisional Application Ser. No. 61/406,579, filed on Oct. 26, 2010, the contents of which are all hereby incorporated by reference herein in their entirety.

TECHNICAL FIELD

The present invention relates to a wireless communication system, and more particularly, to a method for transmitting control information and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently transmitting uplink control information in a wireless communication system and an apparatus for the same. Another object of the present invention is to provide a method for efficiently transmitting uplink control information when two or more uplink control information transmission timing points are overlapped under the state of carrier aggregation and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting an uplink signal from a communication device consisting of a plurality of cells in a frequency division duplex (FDD) wireless communication system comprises the steps of receiving one or more physical downlink control channel (PDCCH) signals and one or more physical downlink shared channel (PDSCH) signals corresponding to the PDCCH signals in a downlink subframe N; generating acknowledgement/negative acknowledgement (ACK/NACK) information on the basis of the result of receipt of at least the one or more PDSCH signals; and transmitting the ACK/NACK information through a PUCCH, wherein if a predetermined condition is satisfied, at least one of the one or more PDCCH signals includes information indicating a downlink assignment index (DAI) value, and if the predetermined condition is not satisfied, at least one of the one or more PDCCH signals includes information indicating a value of a PUCCH resource for the ACK/NACK information, and the information indicating the DAI value and the information indicating the value of the PUCCH resource are provided through same field.

In another aspect of the present invention, a communication device configured to transmit an uplink signal in a state that a plurality of cells are configured in a frequency division duplex (FDD) wireless communication system comprises a radio frequency (RF) unit; and a processor, wherein the processor receives one or more physical downlink control channel (PDCCH) signals and one or more physical downlink shared channel (PDSCH) signals corresponding to the PDCCH signals in a downlink subframe N, generates acknowledgement/negative acknowledgement (ACK/NACK) information on the basis of the result of receipt of at least the one or more PDSCH signal, and transmits the ACK/NACK information through a physical uplink control channel (PUCCH), and if a predetermined condition is satisfied, at least one of the one or more PDCCH signals includes information indicating a downlink assignment index (DAI) value, and if the predetermined condition is not satisfied, at least one of the one or more PDCCH signals includes information indicating a value of a PUCCH resource for the ACK/NACK information, and the information indicating the DAI value and the information indicating the value of the PUCCH resource are provided through same field.

Preferably, the predetermined condition includes that an uplink subframe N+k is the subframe for channel state information (CSI) transmission and k is a positive integer.

Preferably, k is 4.

Preferably, the predetermined condition includes that an uplink subframe N+k is the subframe for scheduling request (SR) transmission and k is a positive integer.

Preferably, if the predetermined condition is satisfied, the ACK/NACK information includes an ACK counter result or ACK/NACK bundling result, and if the predetermined condition is not satisfied, the ACK/NACK information includes a result of individual receipt of each downlink signal.

Preferably, the DAI value represents the order of corresponding PDCCHs or PDSCHs, or the number of scheduled PDCCHs or PDSCHs.

Preferably, the information indicating the DAI value and the information indicating the value of the PUCCH resource are provided through a transmit power control (TPC) field.

Advantageous Effects

According to the present invention, uplink control information may efficiently be transmitted in the wireless communication system. In more detail, the uplink control information may efficiently be transmitted when two or more uplink control information transmission timing points are overlapped under the state of carrier aggregation.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, the following embodiments will be described based on that technical features of the present invention are applied to the 3GPP LTE/LTE-A. However, it is to be understood that the technical spirits of the present invention are not limited to the 3GPP LTE/LTE-A. Also, specific terminologies used hereinafter are provided to assist understanding of the present invention, and various modifications may be made in the specific terminologies within the range that does not depart from the technical spirits of the present invention.

Figure 1:
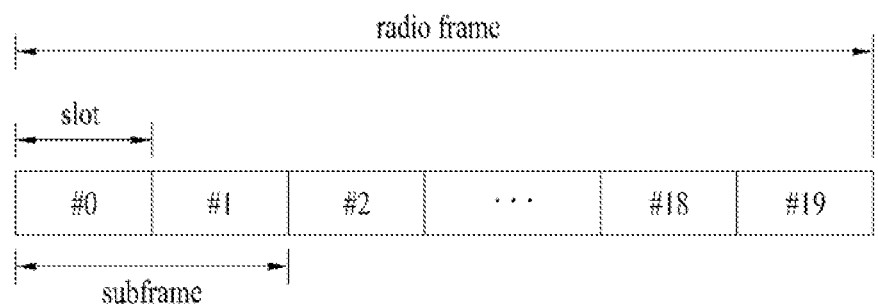
FIG. 1 is a diagram illustrating a structure of a radio frame.

FIG. 1 is a diagram illustrating a structure of a radio frame.

Referring to FIG. 1, the radio frame includes ten (10) subframes, each of which includes two slots in time domain. The time required to transmit the subframes will be referred to as a transmission time interval (TTI). For example, one subframe may have a length of 1 ms, and one slot may have a length of 0.5 ms. One slot includes a plurality of OFDM symbols or SC-FDMA symbols in time domain. Since the LTE uses OFDMA in a downlink and uses SC-FDMA in an uplink, OFDM or SC-FDMA symbols represent one symbol interval. A resource block (RB) is a resource allocation unit, and includes a plurality of continuous subcarriers in one slot. The aforementioned structure of the radio frame is only exemplary, and various modifications may be made in the number of subframes included in the radio frame, the number of slots included in the subframe, or the number of symbols included in the slot.

Figure 2:
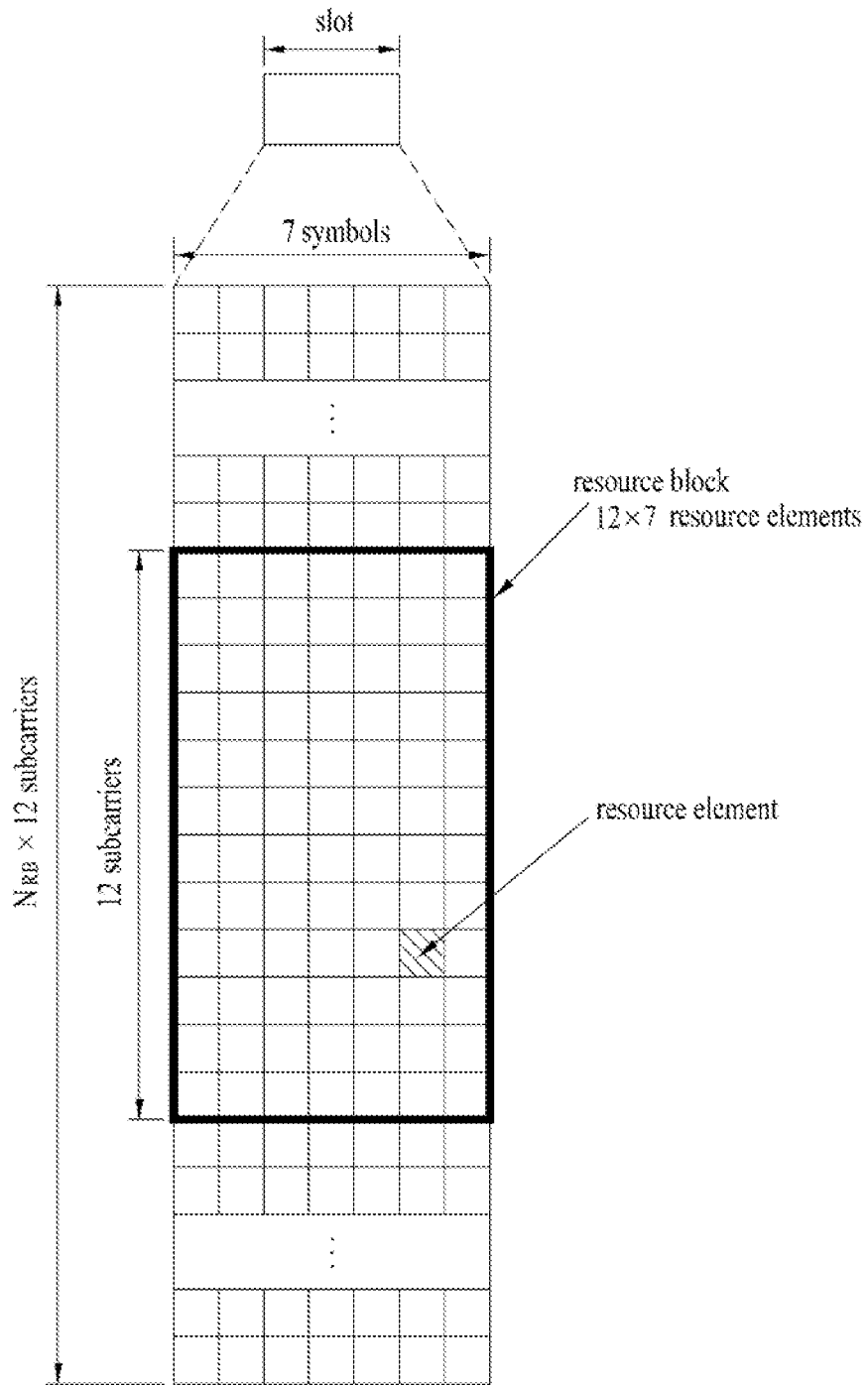
FIG. 2 is a diagram illustrating a resource grid of a downlink slot.

FIG. 2 is a diagram illustrating a resource grid of a downlink slot.

Referring to FIG. 2, the downlink slot includes a plurality of OFDM symbols in a time region. One downlink slot includes seven (or six) OFDM symbols, and a resource block includes twelve subcarriers in frequency domain. Each element on the resource grid will be referred to as a resource element (RE). One resource block (RB) includes 12×7 (or 6) resource elements. The number $N_{RB}$ of resource blocks (RBs) included in the downlink slot depends on a downlink transmission bandwidth. A structure of an uplink slot is the same as that of the downlink slot except that OFDM symbols are replaced with SC-FDMA symbols.

Figure 3:
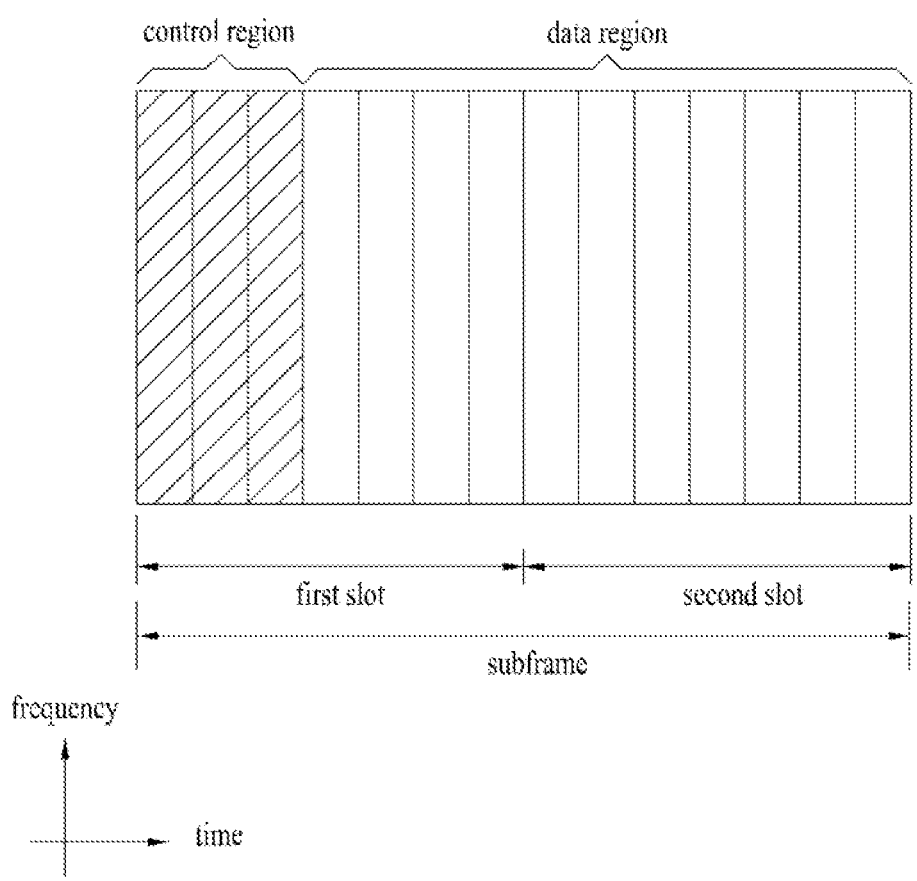
FIG. 3 is a diagram illustrating a structure of a downlink subframe.

FIG. 3 is a diagram illustrating a structure of a downlink subframe.

Referring to FIG. 3, maximum three (or four) OFDM symbols located at the front of the first slot of the subframe correspond to a control region to which a control channel is allocated. The other OFDM symbols correspond to a data region to which a physical downlink shared channel (PDSCH) is allocated. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission.

The control information transmitted through the PDCCH will be referred to as downlink control information (DCI). The DCI includes resource allocation information for a user equipment or user equipment group and other control information. For example, the DCI includes uplink/downlink scheduling information, uplink transmission (Tx) power control command, etc.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a user equipment group, a transmission power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs. A base station determines a PDCCH format depending on the DCI to be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), system information RNTI (SI-RNTI) may be masked with the CRC. If the PDCCH is for a random access response, a random access RNTI (RA-RNTI) may be masked with the CRC.

Figure 4:
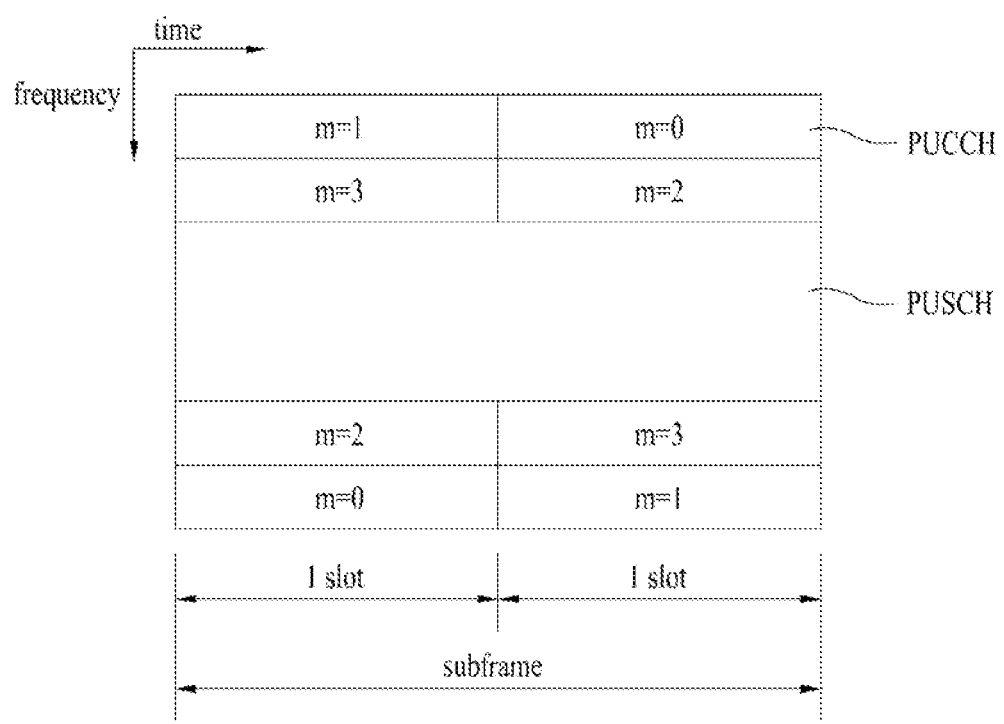
FIG. 4 is a diagram illustrating a structure of an uplink subframe.

FIG. 4 is a diagram illustrating a structure of an uplink subframe in an LTE system.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.
  SR (Scheduling Request): is information used to request uplink UL-SCH resource. The SR is transmitted using an on-off keying (OOK) system.
  HARQ ACK/NACK: is a response signal to a downlink data packet on the PDSCH. It represents whether the downlink data packet has been successfully received. ACK/NACK 1 bit is transmitted in response to a single downlink codeword, and ACK/NACK 2 bits are transmitted in response to two downlink codewords.
  CSI (Channel State Indicator): is feedback information on a downlink channel state. CSI includes CQI (Channel Quality Indicator), MIMO (Multiple Input Multiple Output) related feedback information includes a rank indicator (RI) and a precoding matrix indicator (PMI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation between the PUCCH format and the UCI in the LTE system.

TABLE 1

| PUCCH format | Uplink control information (UCI) |
| --- | --- |
| Format 1 | SR (Scheduling Request) (non-modulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |

Figure 5:
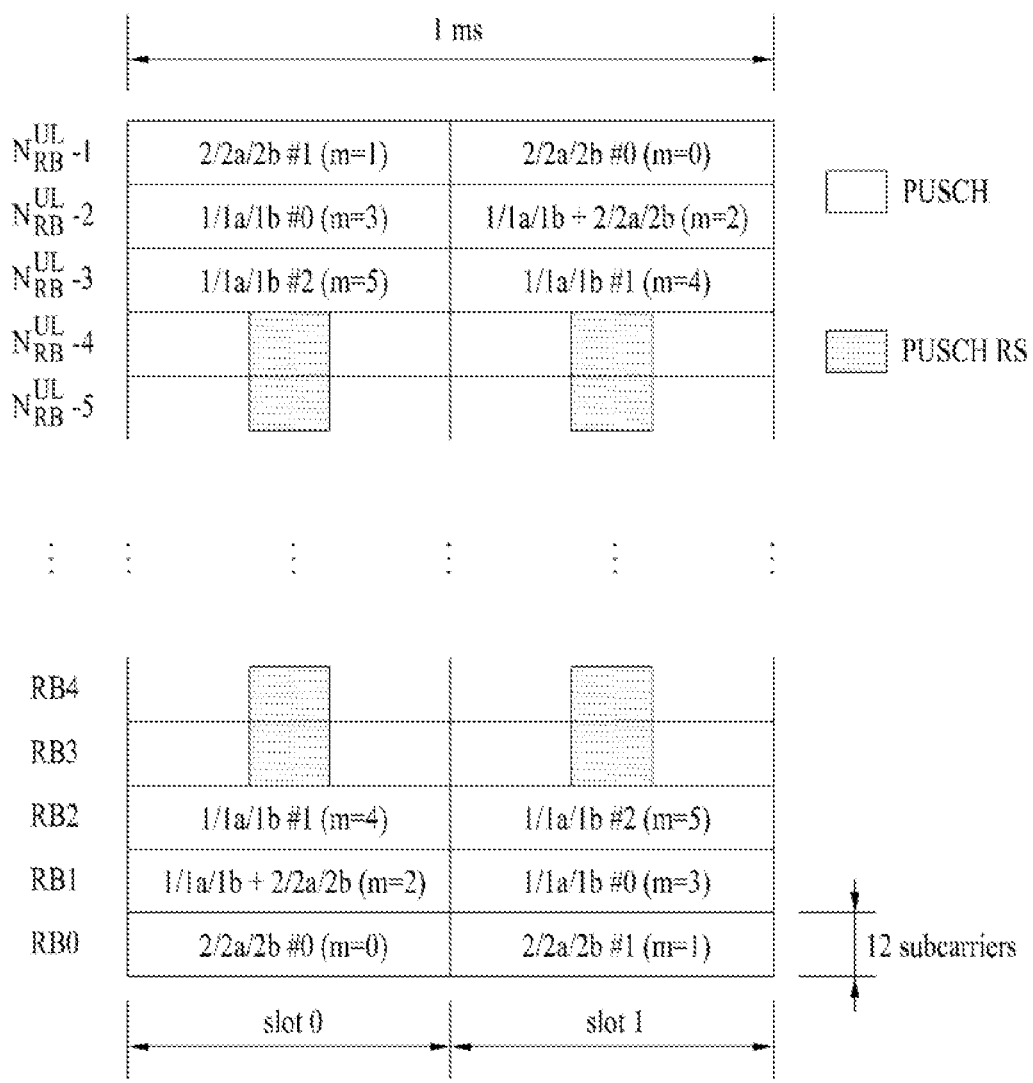
FIG. 5 is a diagram illustrating an example of physical mapping of a PUCCH format into a PUCCH region.

FIG. 5 is a diagram illustrating an example of physical mapping of a PUCCH format into a PUCCH region.

Referring to FIG. 5, the PUCCH format is mapped onto the RBs in order of PUCCH formats 2/2a/2b (CSI)(for example, PUCCH region m=0, 1), PUCCH formats 2/2a/2b (CSI) or PUCCH formats 1/1a/1b (SR/HARQ ACK/NACK) (for example, in case of the presence, PUCCH region m=2), and PUCCH formats 1/1a/1b (SR/HARQ ACK/NACK)(for example, PUCCH region m=3, 4, 5) by starting from band-edge. The number of $N_{RB}^{(2)}$ of PUCCH RBs that may be used for the PUCCH formats 2/2a/2b (CSI) is transmitted to the user equipment through broadcast signaling within the cell.

Figure 6:
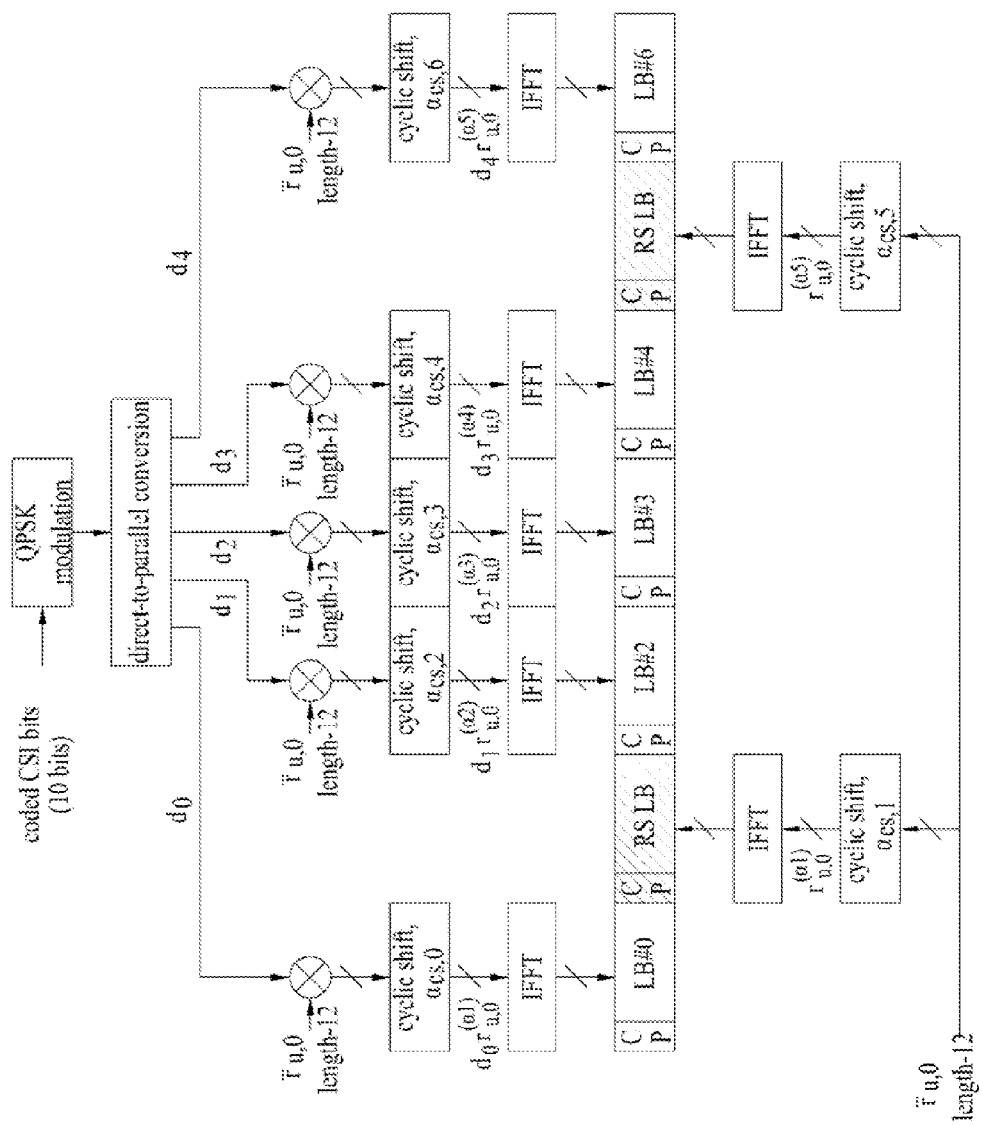
FIG. 6 is a diagram illustrating a structure of a slot level of PUCCH formats 2/2a/2b.

FIG. 6 is a diagram illustrating a structure of a slot level of PUCCH formats 2/2a/2b. The PUCCH formats 2/2a/2b are used for CSI (channel state information) transmission. The CSI includes CQI, PMI, RI, PTI (precoding type indicator), etc. In case of normal cyclic prefix (CP), SC-FDMA symbols #1 and #5 are used for transmission of demodulation reference signal (DM RS) within the slot. In case of extended CP, SC-FDMA symbol (LB) #3 is only used for transmission of the DM RS within the slot.

Referring to FIG. 6, CSI of 10 bits is channel coded to 20 coded bits using rate ½ punctured (20, k) Reed-Muller codes at a subframe level (not shown). Afterwards, the coded bits are mapped into quadrature phase shift keying (QPSK) constellation (QPSK modulation) through scramble (not shown). Scramble may be performed using length-31 gold sequence similarly to PUSCH data. Ten QPSK modulation symbols are generated and five QPSK modulation symbols $d_0 \sim d_4$ are transmitted from each slot through corresponding SC-FDMA symbols. Each of the QPSK modulation symbols is used to modulate a length-12 base RS sequence ($r_{u,o}$) prior to inverse fast fourier transform (IFFT). Consequently, the RS sequence is cyclic-shifted in the time domain in accordance with the values of the QPSK modulation symbols ($d_x * r_{u,o}$, x=0~4). The RS sequence multiplied by the QPSK modulation symbols is cyclic-shifted ($\alpha_{cs,x}$, x=1, 5). If the number of cyclic shifts is N, N number of user equipments may be multiplexed on the same CSI PUCCH RB. Although the DM RS sequence is similar to CSI sequence in the frequency domain, it is not modulated by CSI modulation symbol.

Parameters/resources for periodic report of the CSI are configured semi-statically by higher layer (for example, RRC (radio resource control)) signaling. For example, if a PUCCH resource index $n_{PUCCH}^{(2)}$ is set for CSI transmission, the CSI is transmitted periodically on a CSI PUCCH linked with the PUCCH resource index $n_{PUCCH}^{(2)}$. The PUCCH resource index $n_{PUCCH}^{(2)}$ indicates cyclic shift ($\alpha_{cs}$) and PUCCH RB.

Figure 7:
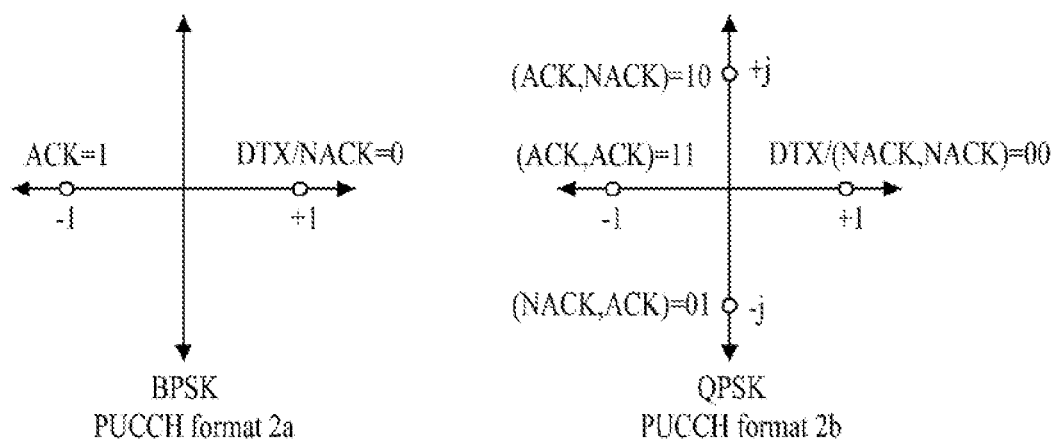
FIG. 7 and FIG. 8 are diagrams illustrating a method for multiplexing ACK/NACK (A/N) and CSI in a user equipment.
Figure 8:
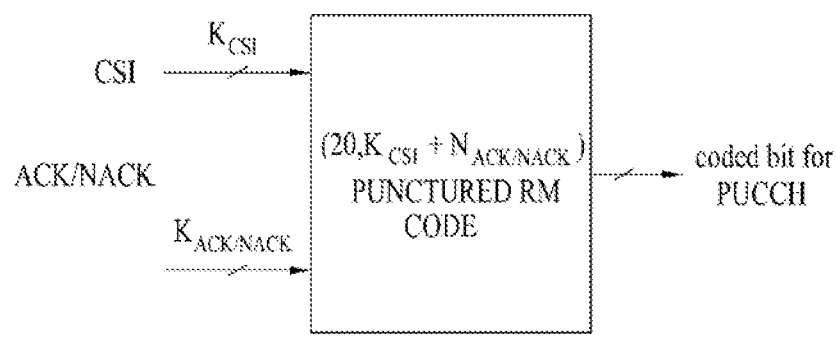

FIG. 7 and FIG. 8 are diagram illustrating a method for multiplexing ACK/NACK (A/N) and CSI in a user equipment.

Simultaneous transmission ACK/NACK and CSI of the user equipment in the LTE system is enabled by user equipment-specific higher layer signaling. If simultaneous transmission is not enabled and ACK/NACK should be transmitted onto the PUCCH for the subframe in which CSI report is set, CSI is dropped and ACK/NACK is only transmitted using the PUCCH formats 1a/1b. In case of the subframe for which the base station allows the user equipment to perform simultaneous transmission of ACK/NACK and CSI, the CSI and 1- or 2-bit ACK/NACK information are multiplexed into the same PUCCH RB. The aforementioned method is implemented differently in the normal CP and the extended CP.

In case of the normal CP, in order to transmit 1- or 2-bit ACK/NACK and CSI together (formats 2/2a/2b), as shown in FIG. 7, the user equipment modulates (non-scrambled) ACK/NACK bit in accordance with BPSK/QPSK. Accordingly, one ACK/NACK modulation symbol $d_{HARQ}$ is generated. ACK is coded to a binary value '1', and NACK is coded to a binary value '0'. Afterwards, the single ACK/NACK modulation symbol $d_{HARQ}$ is used to modulate the second RS (that is, SC-FDMA symbol #5) in each slot. In other words, the ACK/NACK is signaled using the RS for the PUCCH formats 2/2a/2b. The CSI is carried in a UCI data part of the PUCCH formats 2/2a/2b. FIG. 7 illustrates that NACK (or NACK, NACK in case of two MIMO codes) is modulated and mapped into +1 (no RS modulation). Discontinuous transmission (DTX) is processed by NACK. DTX represents that the user equipment has failed to detect DL grant PDCCH.

In case of the extended CP (one RS symbol per slot), 1- or 2-bit HARQ ACK/NACK is joint-coded together with CSI. As a result, (20, $k_{CSI}+k_{A/N}$) Reed-Muller based block code is generated. A 20-bit codeword is transmitted on the PUCCH by using the CSI channel structure of FIG. 6. Joint coding of ACK/NACK and CSI is performed as shown in FIG. 8. The number of bits of the greatest information supported by the block code is 13. Transmissions of two codewords in the downlink correspond to $k_{CSI}=11$ bits and $k_{A/N}=2$ bits.

Figure 9:
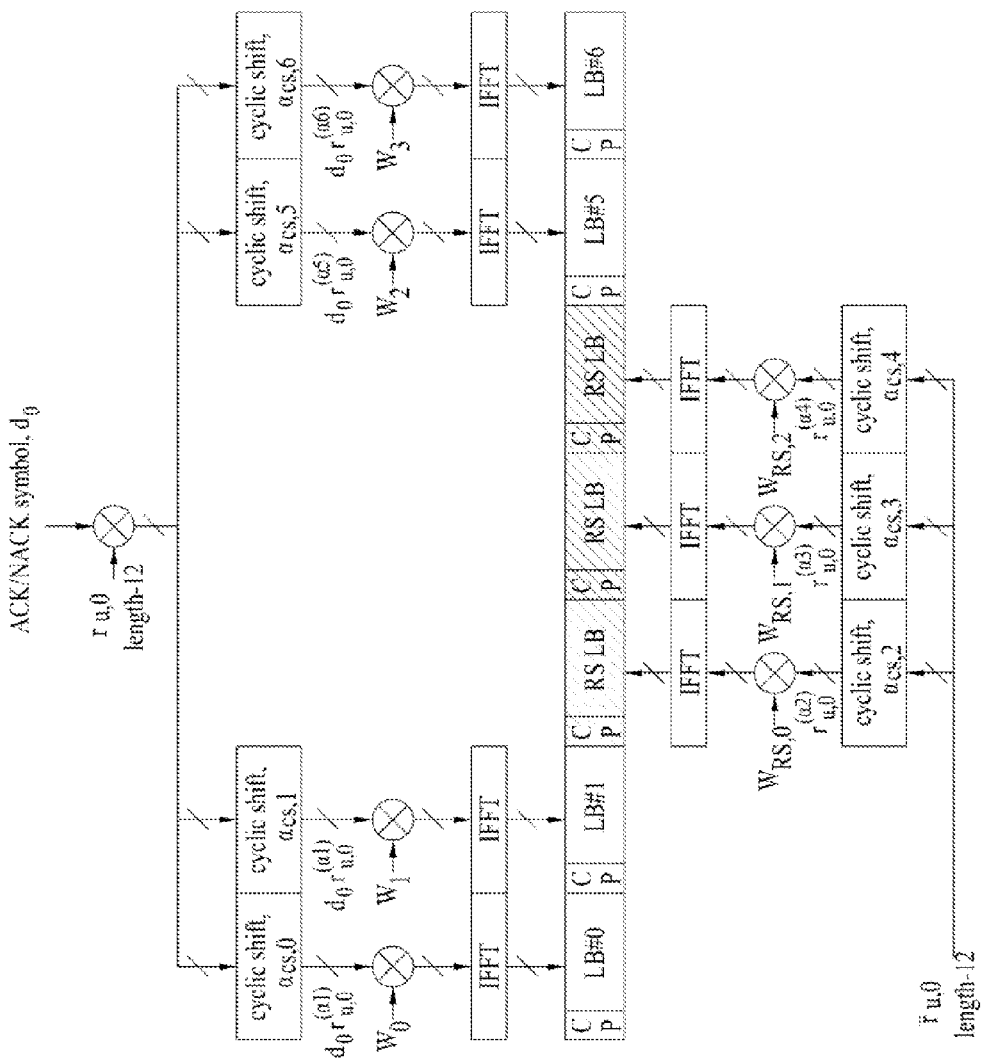
FIG. 9 is a diagram illustrating a structure of a slot level of PUCCH formats 1a/1b.

FIG. 9 is a diagram illustrating a structure of a slot level of PUCCH formats 1a/1b. The PUCCH formats 1a/1b are used for ACK/NACK transmission. In case of the normal CP, SC-FDMA #2/#3/#4 are used for transmission of DM RS (Demodulation Reference Signal). In case of the extended CP, SC-FDMA #2/#3 are used for transmission of DM RS. Accordingly, four SC-FDMA symbols are used for ACK/NACK transmission in the slot.

Referring to FIG. 9, ACK/NACK information of 1 bit and ACK/NACK information of 2 bits are respectively modulated in accordance with a BPSK modulation scheme and a QPSK modulation scheme, and one ACK/NACK modulation symbol ($d_0$) is generated. The ACK/NACK information is set to 1 in case of positive ACK, whereas the ACK/NACK information is set to 0 in case of negative ACK (NACK). The PUCCH formats 1a/1b perform time domain spreading by using orthogonal spreading codes (for example, Walsh-Hadamard or DFT codes) $w_0, w_1, w_2, w_3$ in addition to cyclic shift ($\alpha_{cs,x}$) in the frequency domain in the same manner as the aforementioned CSI. In case of the PUCCH formats 1a/1b, since code multiplexing is used in both the frequency domain and the time domain, more user equipments may be multiplexed on the same PUCCH RB.

The RS transmitted from different user equipments are multiplexed using the same method as that of the UCI. The number of cyclic shifts supported by the SC-FDMA symbols for PUCCH ACK/NACK RB may be configured by a cell-specific higher layer signaling parameter $\Delta_{shift}^{PUCCH}$. $\Delta_{shift}^{PUCCH} \in \{1, 2, 3\}$ respectively represent that shift values are 12, 6 and 4. The number of spreading codes that may actually be used for ACK/NACK in time-domain CDM may be limited by the number of RS symbols. This is because that multiplexing capacity of the RS symbols is smaller than that of UCI symbols due to a small number of RS symbols.

Figure 10:
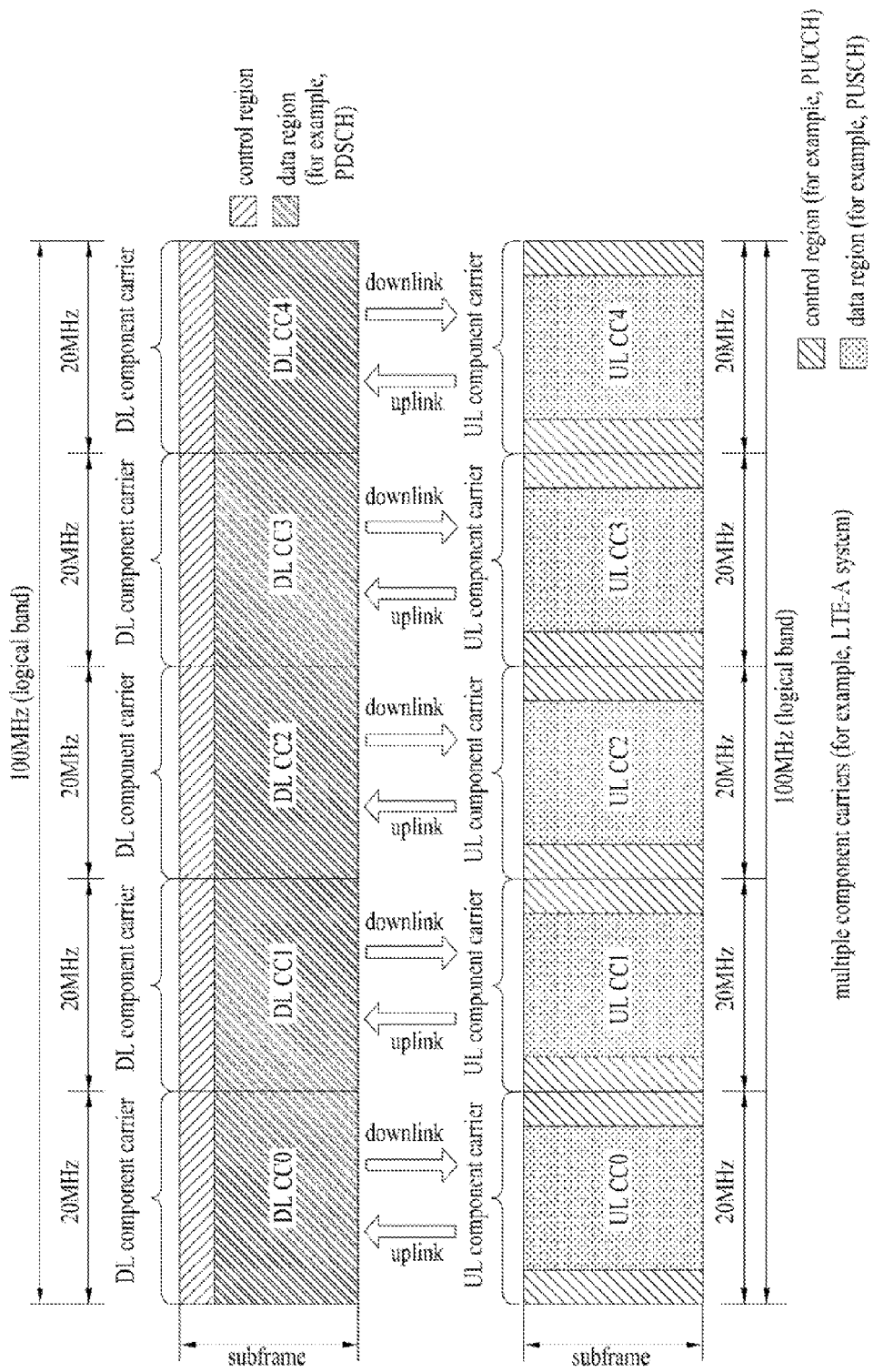
FIG. 10 is a diagram illustrating a carrier aggregation (CA) communication system.

FIG. 10 is a diagram illustrating a carrier aggregation (CA) communication system. The LTE-A system uses the carrier aggregation technology or the bandwidth aggregation technology, which uses greater uplink/downlink bandwidth through a plurality of uplink/downlink frequency blocks, to use wider frequency bandwidth. Each frequency block is transmitted using a component carrier (CC). The component carrier may be understood as carrier frequency (or center carrier or center frequency) for a corresponding frequency block.

Referring to FIG. 10, a plurality of uplink/downlink component carriers (CC) may be collected to support wider uplink/downlink bandwidth. The respective CCs may adjoin each other or not in the frequency domain. A bandwidth of each component carrier may be defined independently. Asymmetric carrier aggregation where the number of UL CCs is different from the number of DL CCs may be performed. For example, if the number of DL CCs is 2 and the number of UL CCs is 1, carrier aggregation may be configured to correspond to 2:1. DL CC/UL CC links may be fixed to the system or may be configured semi-statically. Also, even though a system full band includes N number of CCs, a frequency band that may be monitored and received by a specific user equipment may be limited to M(<N) number of CCs. Various parameters for carrier aggregation may be configured cell-specifically, user equipment group-specifically, or user equipment-specifically. Meanwhile, the control information may be set to be transmitted and received through a specific CC only. This specific CC may be referred to as a primary CC (PCC) (or anchor CC), and the other CCs may be referred to as secondary CCs (SCC).

The LTE-A system uses a concept of cell to manage radio resources. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a secondary cell (SCell). The PCell is used such that the user equipment performs an initial connection establishment procedure or connection re-establishment procedure. The PCell may refer to a cell indicated during a handover procedure. The SCell may be configured after RRC connection is established, and may be used to provide an additional radio resource. The PCell and the SCell may be referred to as serving cells. Although the user equipment is in RRC-CONNECTED state, if it is not set by carrier aggregation or does not support carrier aggregation, a single serving cell configured by the PCell only exists. On the other hand, if the user equipment is in the RRC-CONNECTED state and is set by carrier aggregation, one or more serving cells may exist, wherein the serving cells may include the PCell and full SCells. After an initial security activity procedure starts, for the user equipment supporting carrier aggregation, the network may configure one or more SCells in addition to the PCell initially configured during a connection establishment procedure.

If cross-carrier scheduling (or cross-CC scheduling) is used, the PDCCH for downlink allocation is transmitted to DL CC #0, and the corresponding PDSCH may be transmitted to DL CC #2. For cross-carrier scheduling, introduction of a carrier indicator field (CIF) may be considered. The presence of CIF within the PDCCH may be configured by higher layer signaling (for example, RRC signaling) semi-statically and user equipment-specifically. The basic principle of PDCCH transmission will be summed up as follows.

CIF disabled: the PDCCH on the DL CC allocates PDSCH resource on the same DL CC or PUSCH resource on one linked UL CC.

CIF enabled: the PDCCH on the DL CC may allocate PDSCH or PUSCH resource on a specific DL/UL CC among a plurality of aggregated DL/UL CCs by using the CIF.

If the CIF exists, the base station may allocate a PDCCH monitoring DL cell set to reduce complexity load of blind decoding (BD) in view of the user equipment. The PDCCH monitoring DL CC set includes one or more DL CCs as a part of the aggregated DL CCs, and the user equipment detects and decodes the PDCCH on the corresponding DL CC only. In other words, if the base station schedules the PDSCH/PUSCH to the user equipment, the PDCCH is transmitted through the PDCCH monitoring DL CC set only. The PDCCH monitoring DL CC set may be configured user equipment-specifically, user equipment group-specifically or cell-specifically. The terms "PDCCH monitoring DL CC" may be replaced with the equivalent terms such as monitoring carrier and monitoring cell and the aggregated CC for the user equipment may be replaced with the equivalent terms such as serving CC, serving carrier and serving cell.

Figure 11:
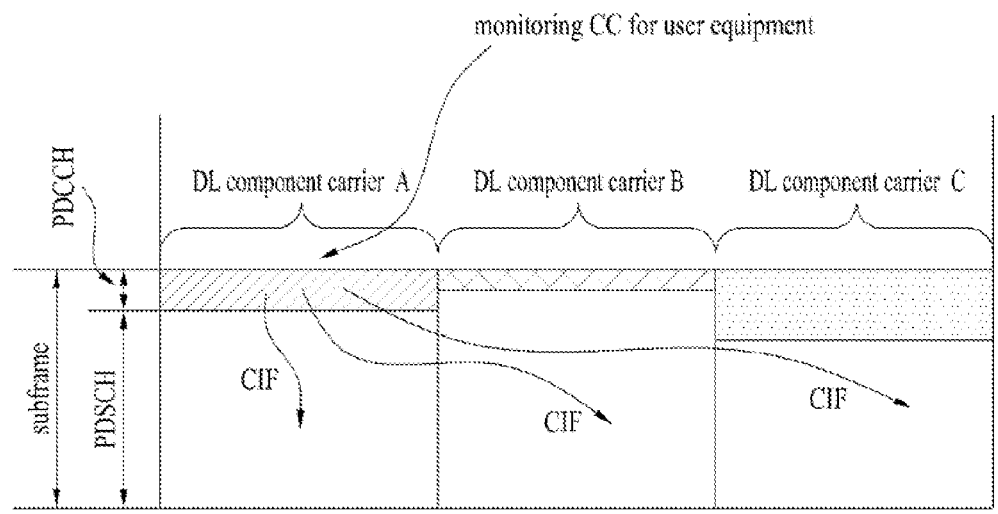
FIG. 11 is a diagram illustrating cross-carrier scheduling.

FIG. 11 is a diagram illustrating scheduling when a plurality of carriers are aggregated. It is assumed that three DL cells are aggregated. It is also assumed that DL CC A is set to a PDCCH monitoring DL CC. DL CC A to DL CC C may be referred to as serving CCs, serving carriers, serving cells, etc. If the CIF is disabled, each DL CC may transmit the PDCCH only that schedules PDSCH of the DL CC without CIF in accordance with the LTE PDCCH rule. On the other hand, if the CIF is enabled by user equipment-specific (or user equipment group-specific or cell-specific) higher layer signaling, the DL CC A (monitoring DL CC) may transmit the PDCCH, which schedules the PDSCH of another CC, as well as the PDCCH, which schedules the PDSCH of the DL CC A. In this case, the PDCCH is not transmitted from the DL CC B/C which is not set to the PDCCH monitoring DL CC.

The LTE-A system considers that a plurality of ACK/NACK information/signals for a plurality of PDSCHs transmitted through a plurality of DL CCs are transmitted through a specific UL CC. To this end, unlike ACK/NACK transmission based on the PUCCH formats 1a/1b in the existing LTE system, after joint coding (for example, Reed-Muller code, Tail-biting convolutional code, etc.) is applied to the plurality of kinds of ACK/NACK information, transmission of the plurality of kinds of ACK/NACK information/signals based on a new PUCCH format (referred to as E-PUCCH (Enhanced PUCCH) format or PUCCH format M) may be considered. The E-PUCCH format includes a block-spreading based PUCCH format as follows. After joint coding, ACK/NACK transmission based on the E-PUCCH format is only exemplary, and the E-PUCCH format may be used for UCI transmission without limitation. For example, the E-PUCCH format may be used for transmission of ACK/NACK, CSI (for example, CQI, PMI, RI, PTI, etc.), or SR, or simultaneous transmission of two or more of them. Accordingly, in the present invention, the E-PUCCH format may be used to transmit joint coded UCI codewords regardless of types/the number/size of UCI.

Figure 12:
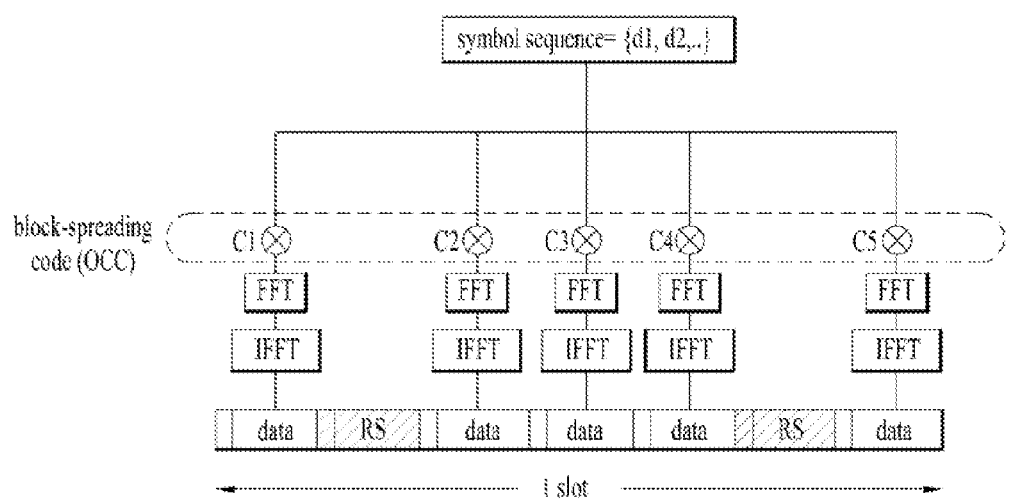
FIG. 12 and FIG. 13 are diagrams illustrating a structure of a slot level of a PUCCH format 3.

FIG. 12 is a diagram illustrating a structure of a slot level of a PUCCH format 3. The PUCCH format 3 is a block-spreading based PUCCH format. In more detail, in case of the PUCCH format 3, one symbol sequence is transmitted over the frequency domain, and user equipment multiplexing is performed using orthogonal cover code (OCC) based time-domain spreading. In other words, the symbol sequence is transmitted by time-domain spreading based on the OCC. Control signals of several user equipments may be multiplexed into the same RB by using the OCC.

Referring to FIG. 12, five SC-FDMA symbols (that is, UCI data part) are generated from one symbol sequence {d1, d2, ... } by using OCCs C1 to C5 of a length-5 (SF (spreading factor)=5). In this case, the symbol sequence {d1, d2, ... } may mean a modulation symbol sequence or codeword bit sequence. If the symbol sequence {d1, d2, ... } means a codeword bit sequence, the block diagram of FIG. 12 further includes a modulation block. Although a total of two RS symbols (that is, RS part) are used for one slot in the drawing, various applications may be considered in such a manner that RS part of three RS symbols is used and UCI data part based on OCC of SF=4 is used. In this case, the RS symbols may be generated from CAZAC sequence having a specific cyclic shift. Also, the RS may be transmitted in a format in which a specific OCC is applied to (multiplied by) a plurality of RS symbols of the time domain. The block-spread UCI is transmitted to the network in a unit of SC-FDMA symbol through a fast fourier transform (FFT) procedure and an inverse fast fourier transform (IFFT) procedure. In other words, the block-spreading scheme modulates control information (for example, ACK/NACK, etc.) by using the SC-FDMA scheme unlike the PUCCH format 1 or 2 of the existing LTE system.

Figure 13:
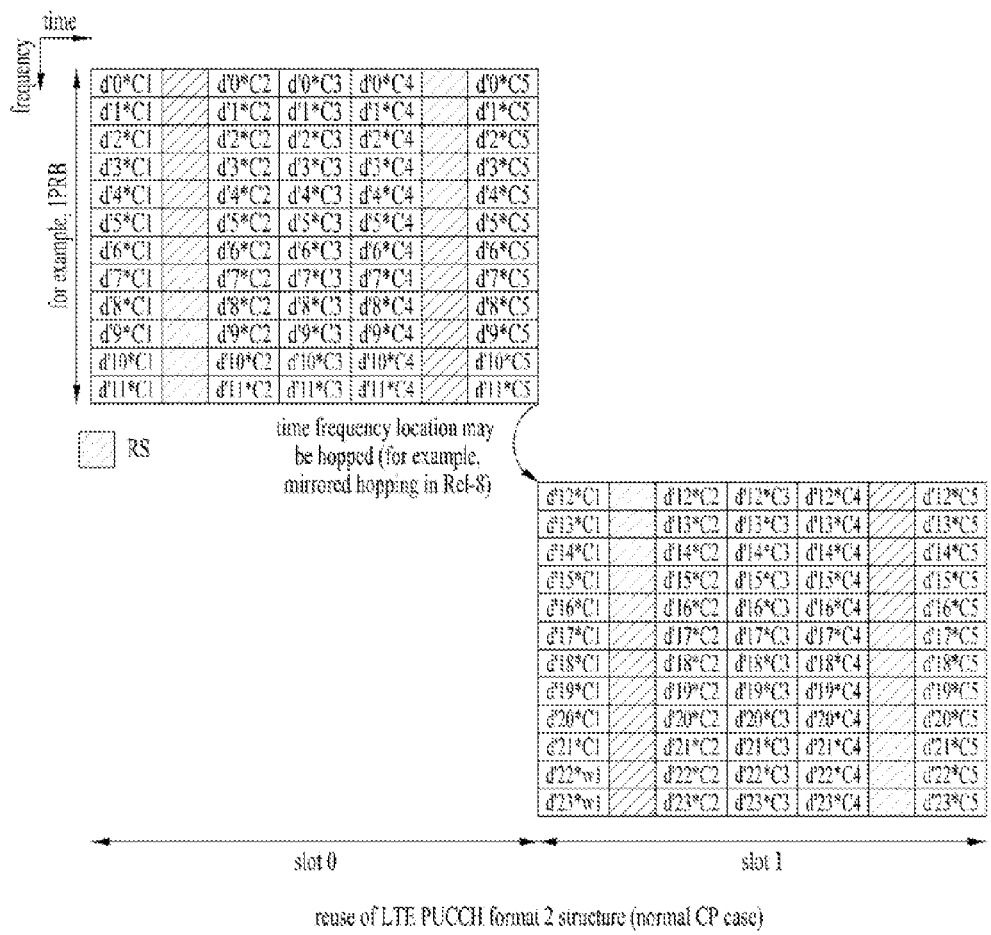

FIG. 13 illustrates a structure of a PUCCH format 3 at a subframe level.

Referring to FIG. 13, symbol sequences {d'0 to d'11} in a slot 0 are mapped into subcarrier of one SC-FDMA symbol and mapped into five SC-FDMA symbols by block-spreading based on OCCs C1 to C5. Similarly, symbol sequences {d'12 to d'23} in a slot 1 are mapped into subcarrier of one SC-FDMA symbol and mapped into five SC-FDMA symbols by block-spreading based on OCCs C1 to C5. In this case, the symbol sequences {d'0 to d'11} or the symbol sequences {d'12 to d'23} shown in each slot represent the format in which FFT or FFT/IFFT is applied to the symbol sequences {d1, d2, ... } of FIG. 13. If the symbol sequences {d'0 to d'11} or {d'12 to d'23} corresponds to the format in which FFT is applied to the symbol sequences {d1, d2, ... } of FIG. 13, IFFT is additionally applied to the symbol sequences {d'0 to d'11} or {d'12 to d'23} to generate SC-FDMA symbols. The total symbol sequences {d'0 to d'23} are generated by joint coding of one or more UCI, and the first half {d'0 to d'11} is transmitted through the slot 0, and the other half {d'12 to d'23} is transmitted through the slot 1. Although not shown, the OCC may be varied in a unit of slot, and UCI data may be scrambled in a unit of SC-FDMA symbol.

For convenience of description, the channel coding based UCI (for example, a plurality of kinds of ACK/NACK) transmission scheme based on the PUCCH format 3 will be referred to as a "multi-bit UCI coding" transmission scheme. In case of ACK/NACK, for example, the multi-bit UCI coding transmission scheme represents a method for joint coding ACK/NACK or DTX information (which means that it fails to receive/detect PDCCH) for the PDCCH indicating release of semi-persistent scheduling (SPS) and/or PDSCH of a plurality of DL cells and transmitting the generated coded ACK/NACK block. For example, it is assumed that the user equipment is operated in a DL cell in accordance with a single user multiple input multiple output (SU-MIMO) mode and receives two codewords. In this case, a total of four feedback states of ACK/ACK, ACK/NACK, NACK/ACK, and NACK/NACK or maximum five feedback states including DTX may exist for the corresponding cell. If the user equipment receives a single codeword, maximum three states of ACK, NACK, DTX may exist (if NACK is processed equally to DTX, a total of two states of ACK, NACK/DTX may exist). Accordingly, if the user equipment aggregate maximum five DL cells and is operated in all the cells in accordance with the SU-MIMO mode, maximum $5^5$ feedback states that may be transmitted may exist. As a result, a necessary ACK/NACK payload size becomes at least 12 bits. If DTX is processed equally to NACK, the number of feedback states is $4^5$, and the necessary ACK/NACK payload size becomes at least 10 bits.

Resources for the PUCCH format 3 may be given explicitly. In more detail, PUCCH resource set is configured by higher layer (for example, RRC), and PUCCH resource which will be used actually may be indicated using an ACK/NACK resource indicator (ARI) value of the PDCCH.

Table 2 illustrates an example explicitly indicating PUCCH resources for HARQ-ACK.

TABLE 2

| Value (ARI) of HARQ-ACK resource for PUCCH | $N^{(3)}_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

ARI: ACK/NACK Resource Indicator. In Table 2, the higher layer includes an RRC layer, and the ARI value may be indicated through the PDCCH which carries DL grant. For example, the ARI value may be indicated using a transmit power control (TPC) field of one or more PCell PDCCHs which do not correspond to initial DAI value and/or SCell PDCCH. PRB for ACK/NACK transmission and OCC are obtained from $N^{(3)}_{PUCCH}$.

In the existing LTE system, ACK/NACK transmission for PDSCH (in view of ACK/NACK feedback, in this specification, PDSCH may include PDCCH (for example, PDCCH indicating SPR release) that requires ACK/NACK feedback) transmitted through one DL CC is only required, and as described with reference to FIG. 7 and FIG. 8, if the ACK/NACK transmission timing point is overlapped with the CSI transmission timing point, ACK/NACK information is transmitted using the PUCCH formats 2/2a/2b for the CSI. The ACK/NACK information may be transmitted on the PUCCH formats 2/2a/2b through RS modulation (in case of normal CP) (see FIG. 7) or joint coding (in case of extended CP) (see FIG. 8). In the meantime, the LTE-A system considers that a plurality of kinds of ACK/NACK for a plurality of PDSCHs transmitted through a plurality of DL CCs are transmitted through a specific UL CC (for example, UL PCC, UL PCell). Under the circumstances, if the ACK/NACK transmission timing point is overlapped with the CSI transmission timing point (that is, CSI subframe), the plurality of kinds of ACK/NACK information may be transmitted using the PUCCH formats 2/2a/2b for the CSI after compression. The plurality of kinds of ACK/NACK information may be compressed by, but not limited to, the following two schemes. The compressed ACK/NACK information may be transmitted on the PUCCH formats 2/2a/2b through RS modulation or joint coding.

ACK counter: indicates a total number of ACK (or some of a total number of ACK) for all the PDCCHs (PDCCH, which requires ACK/NACK feedback, including PDCCH indicating SPS release) which are received. The ACK counter may indicate the number of ACK in case of ACK only for all the received PDSCHs in accordance with its implementation scheme. Table 3 illustrates an example of the ACK counter. Table 3 illustrates that the ACK counter is expressed by 2 bits, and various bits used to indicate the ACK counter may be configured in accordance with the implementation examples.

TABLE 3

| The number of ACK in multiple ACK/NACK responses | b(0), b(1) |
|---|---|
| 0 or None (case where user equipment misses at least one DL allocation (that is, DTX)) | 0, 0 |
| 1 | 1, 1 |
| 2 | 1, 0 |
| 3 | 0, 1 |
| 4 | 1, 1 |
| 4 | 1, 0 |
| 5 | 0, 1 |
| 6 | 1, 1 |
| 7 | 1, 0 |
| 8 | 0, 1 |
| 9 | 1, 1 |
| 10 | 1, 0 |

A/N bundling: is the scheme where a plurality of ACK/NACK responses are grouped by logical-AND operation. For example, A/N bundling result is processed as ACK if all the PDCCHs (PDCCH, which requires ACK/NACK feedback, including PDCCH indicating SPS release) which are received are ACK, and is processed as NACK if not so. A/N bundling may be performed per codeword on the plurality of DL CCs (or cells). In other words, codewords of the same index on the plurality of DL CCs may be grouped by A/N bundling. Also, A/N bundling may be used/processed per DL CC group.

In the meantime, in case of the aforementioned schemes, exact ACK/NACK information may be provided only if the user equipment has successfully received all the PDCCHs, which are transmitted for PDSCH scheduling, from the base station. In other words, if the user equipment fails to detect (that is, DTX) the PDCCHs transmitted for PDSCH scheduling from the base station, exact ACK/NACK information may not be guaranteed.

Figure 14:
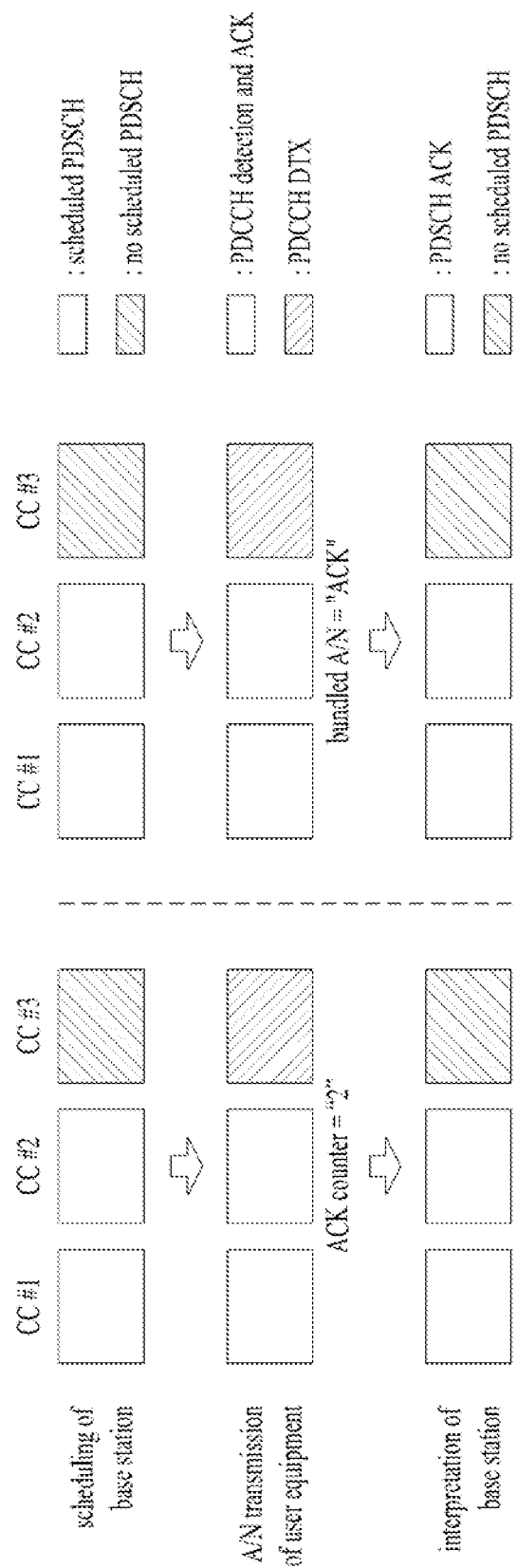
FIG. 14 and FIG. 15 are diagrams illustrating examples of correct action and incorrect action when ACK counter and A/N bundling scheme are used.
Figure 15:
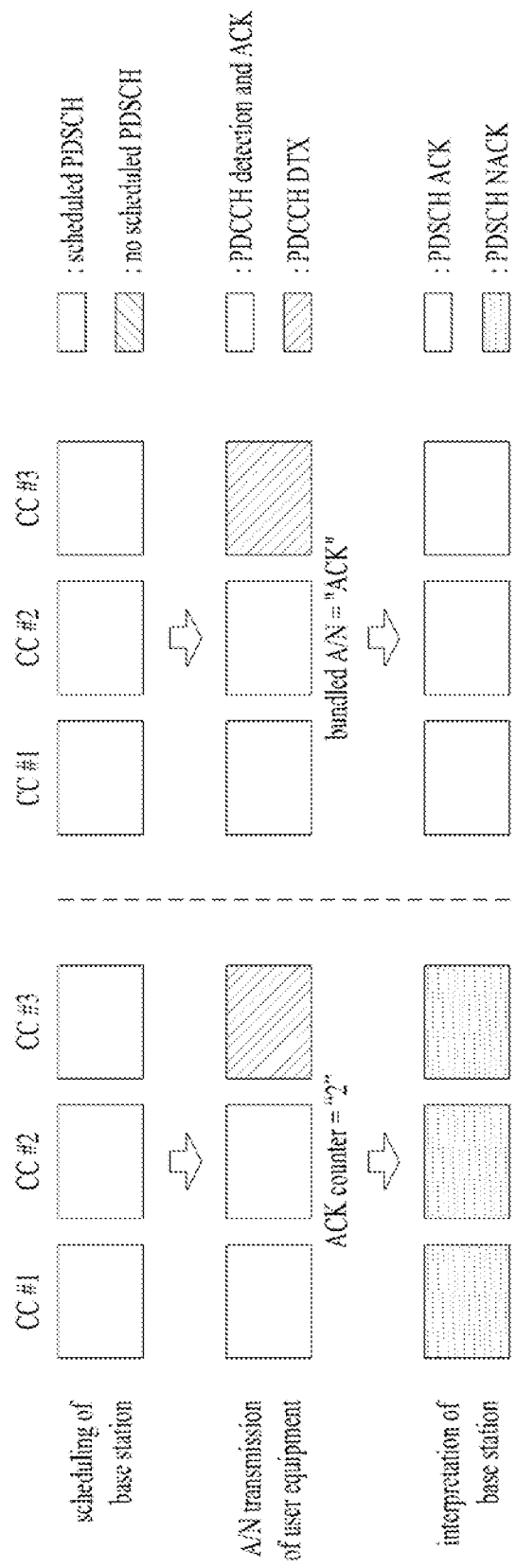

FIG. 14 and FIG. 15 are diagrams illustrating examples of correct action and incorrect action when ACK counter and A/N bundling scheme are used. It is assumed that three DL CCs are provided. It is also assumed that A/N response to the PDSCH is always ACK. In the drawing, it is assumed that an uplink subframe for which ACK/NACK is transmitted is the subframe (for convenience, referred to as CSI subframe) for CSI transmission and that ACK/NACK is transmitted using the PUCCH format/resource for CSI. If ACK/NACK is transmitted for the subframe other than the CSI subframe, it may be transmitted using the PUCCH formats 1a/1b or the PUCCH format 3 described with reference to FIG. 12 and FIG. 13.

Referring to FIG. 14, the base station performs scheduling of DL CC #1 and DL CC #2, and the user equipment successfully receives the PDCCH, which schedules DL CC #1 and DL CC #2, without DTX. In this case, the user equipment notifies the base station of ACK counter=2 or bundled A/N=ACK. The base station may note, from the ACK/NACK feedback received from the user equipment, that response results to the PDSCH of DL CC #1 and DL CC #2 are all ACK.

Referring to FIG. 15, the base station performs scheduling of DL CC #1, DL CC #2 and DL CC #3, and the user equipment successfully receives the PDCCH, which schedules DL CC #1 and DL CC #2, without DTX. On the other hand, DTX is generated for the PDCCH, which schedules DL CC #3. In case of ACK counter, the user equipment performs the ACK counter for two DL CCs (for example, PDSCH) only. Accordingly, the user equipment indicates the total number of ACKs (for example, 2) for the two PDSCHs, and the base station cannot identify two of three DL CCs, to which DL CCs corresponding to ACK belongs. For this reason, an error may occur in interpretation of the ACK counter. To prevent the error from being generated, the base station may process all of the three DL CCs as NACK. In case of A/N bundling, the user equipment performs A/N bundling for two DL CCs (for example, PDSCH) only. Accordingly, although the user equipment processes/transmits the A/N bundling result of the two PDSCHs as ACK, the base station may misunderstand ACK/NACK feedback of the user equipment as ACK of all of the three DL CCs.

To solve the above problem, the present invention suggests a method for signaling a downlink assignment index (DAI) by using a specific field within the PDCCH for a subframe (hereinafter, referred to as A/N-linked subframe) for which a downlink signal corresponding to ACK/NACK to be transmitted through CSI subframe is transmitted.

In the present invention, the downlink signal corresponding to ACK/NACK includes a PDSCH signal or a PDCCH signal indicating SPS release. Also, the PDCCH on the A/N linked subframe includes a PDCCH, which schedules the PDSCH, or a PDCCH, which indicates SPS release.

In the present invention, the specific field within the PDCCH may be a field indicating ARI (that is, HARQ-ACK resource value). This is because that ARI is not used if the ACK/NACK transmission timing point is overlapped with the CSI transmission timing point, and if ACK/NACK is transmitted using the PUCCH format/resource for CSI due to simultaneous transmission mode of ACK/NACK+CSI. The field indicating ARI may be a transmit power control (TPC) field of SCC PDCCH (or SCell PDCCH). The SCC PDCCH (or SCell PDCCH) means the PDCCH used to schedule the PDSCH on the SCC (or SCell).

In the present invention the DAI value may represent, but not limited to, DAI-counter in case of ACK counter and DAI-total in case of A/N bundling. Since the PDSCH (that is, SPS PDSCH) scheduled by SPS is scheduling information previously known by the user equipment and the base station, the SPS PDSCH may not be included in the PDSCH when DAI value (for example, DAI-counter, DAI-total) is set. The DAI value (for example, DAI-counter, DAI-total) may start with 0, 1 or a random number. For convenience, it is assumed that the DAI value starts with 1.

DAI-counter: indicates PDSCH (or PDCCH) order scheduled based on a previously given order (for example, CC order). For example, if the CC order is CC #1, CC #2, CC #3, and CC #1 and CC #3 are scheduled, the DAI-counter values are signaled to 1 and 2, respectively, on the PDCCH of CC #1 and CC #3. Considering a 2-bit DAI-counter, module 4 operation may be applied to a DAI-counter value that exceeds 4.

DAI-total: indicates a total number of PDSCHs (or PDCCHs) which are scheduled. For example, if CC #1 and CC #3 of CC #1, CC #2, and CC #3 are scheduled, the DAI-total values are signaled to 2, 2, respectively, on the PDCCH of CC #1 and CC #3. Considering 2-bit DAI-total, module 4 operation may be applied to a DAI-total value that exceeds 4.

In more detail, a DAI-counter based ACK counter may indicate 1) the number of ACKs only if the last DAI-counter value which is received corresponds to the total number of ACKs, or 2) the number of ACKs corresponding to the first DAI-counter value to the last DAI-counter value, in which ACK is contiguous. Also, in case of the DAI-total based A/N bundling, the received DAI-total value may be processed as ACK only if the DAI-total value corresponds to the total number of ACKs.

Hereinafter, the embodiment of the present invention will be described in more detail with reference to FIG. 16 to FIG. 18. In this embodiment, it is assumed that a plurality of carriers are aggregated in the FDD system. It is also assumed that the simultaneous transmission mode of ACK/NACK+CSI is enabled by higher layer signaling. Moreover, it is assumed that ACK/NACK is set to be transmitted using the PUCCH format 3.

Figure 16:
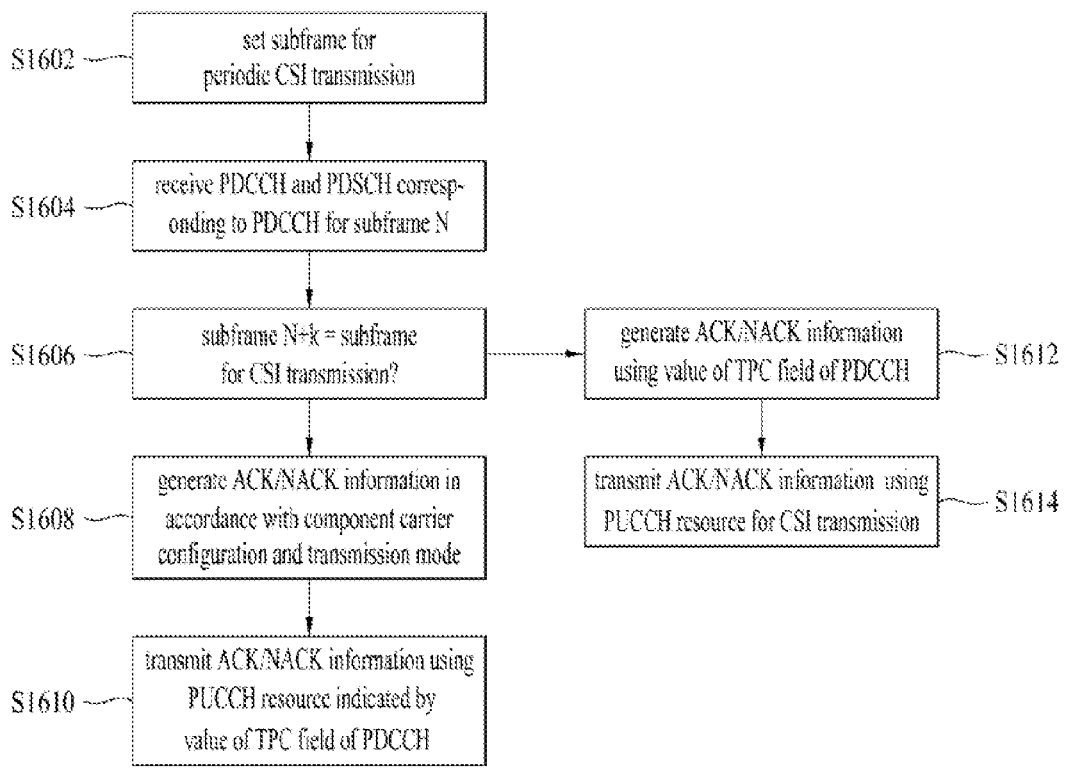
FIG. 16, FIG. 17 and FIG. 18 are diagrams illustrating a procedure of transmitting uplink control information in accordance with one embodiment of the present invention.

FIG. 16 is a diagram illustrating a procedure of transmitting uplink control information in accordance with one embodiment of the present invention.

Referring to FIG. 16, the user equipment sets a subframe (for convenience, referred to as CSI subframe) for periodic CSI transmission (S1602). The CSI subframe is specified by subframe interval (that is, transmission period) and subframe offset, and may be configured by higher layer (for example, RRC) signaling. Since one subframe corresponds to 1 ms, the subframe interval and offset may equivalently be given in a unit of ms. Afterwards, the user equipment receives a downlink signal, which requires ACK/NACK feedback, for the subframe N (S1604). The downlink signal, which requires ACK/NACK feedback, includes (1) a PDSCH signal having a corresponding DL grant PDCCH signal, (2) a PDSCH signal (for example, SPS PDSCH) having no corresponding DL grant PDCCH signal, and (3) a PDCCH signal indicating SPS release.

If a subframe N+k is not the CSI subframe, the user equipment generates ACK/NACK information in accordance with component carrier configuration and transmission mode (S1608). In this case, k represents a positive integer, and, for example, may be 4. For example, P number of DL CCs are configured, Q number of DL CCs support transmission of maximum one transport block (for example, Non-MIMO mode), and P-Q number of DL CCs support transmission of maximum two transport blocks (for example, MIMO mode), ACK/NACK payload may be configured by $Q*1+(P-Q)*2$ bits. In this case, the user equipment may transmit ACK/NACK information by using a PUCCH resource indicated by a value of the TPC field of the PDCCH (S1610). The PDCCH used to indicate the PUCCH resource at the step S1610 may be limited to the SCC PDCCH (or SCell PDCCH). In this case, the value of the TPC field of the PCC PDCCH (or PCell PDCCH) may be used to control PUCCH transmission power. At the step S1610, the PUCCH resource includes a PUCCH format 3 resource.

In the meantime, if the subframe N+k is the CSI subframe, the user equipment may generate ACK/NACK information by using the value of the TPC field of the PDCCH (S1612). In this case, the value of the TPC field may indicate DAI, for example, DAI-counter, DAI-total. The DAI-counter based ACK counter may indicate 1) the number of ACKs, but not limited to, only if the last DAI-counter value which is received corresponds to the total number of ACKs, or 2) the number of ACKs corresponding to the first DAI-counter value to the last DAI-counter value, in which ACK is contiguous. Also, in case of the DAI-total based A/N bundling, the received DAI-total value may be processed/transmitted as ACK only if the DAI-total value corresponds to the total number of ACKs, or may be processed/transmitted as NACK in the other cases. The PDCCH used to indicate the DAI at the step S1612 may be limited to the SCC PDCCH (or SCell PDCCH). In this case, the value of the TPC field of the PCC PDCCH (or PCell PDCCH) may be used to control PUCCH transmission power. Afterwards, the user equipment may transmit ACK/NACK information by using the PUCCH format/resource for CSI transmission (S1614). The PUCCH format/resource for CSI transmission may previously be set by higher layer (for example, RRC) signaling. The ACK/NACK information may be carried in the PUCCH formats 2/2a/2b by using RS modulation and joint coding.

Figure 17:
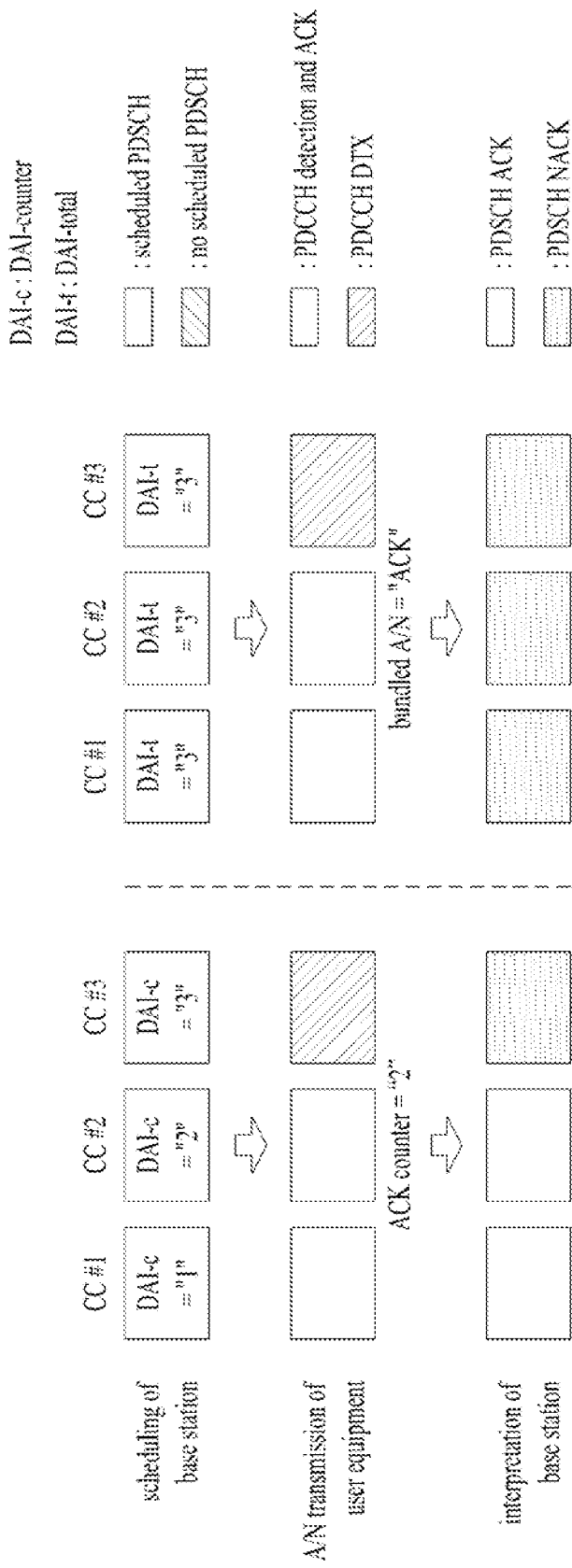

FIG. 17 illustrates an example of ACK/NACK transmission action for a CSI subframe. This example assumes the same status as that of FIG. 15 illustrating incorrect action performed during ACK/NACK transmission. In other words, it is assumed that the base station schedules DL CC #1, DL CC #2, and DL CC #3 and DTX is generated for the PDCCH that schedules DL CC #3.

Referring to FIG. 17, in case of the ACK counter, since the last DAI-counter value received by the user equipment corresponds to the total number 2 of ACKs (or since the last DAI-counter value in which ACK is contiguous is 2), the user equipment notifies the base station that the number of ACKs is 2. In this case, the base station may identify that two DL CCs corresponding to ACK are DL CC #1 and DL CC #2. Also, in case of A/N bundling, since the DAI-total value (that is, 3) does not correspond to the number of ACKs (that is, 2), the user equipment processes/transmits ACK/NACK information (that is, A/N bundling result) as NACK. If A/N bundling=NACK is received from the user equipment, the base station may recognize that at least one of DL CC #1, DL CC #2 and DL CC #3 is NACK or DTX.

Figure 18:
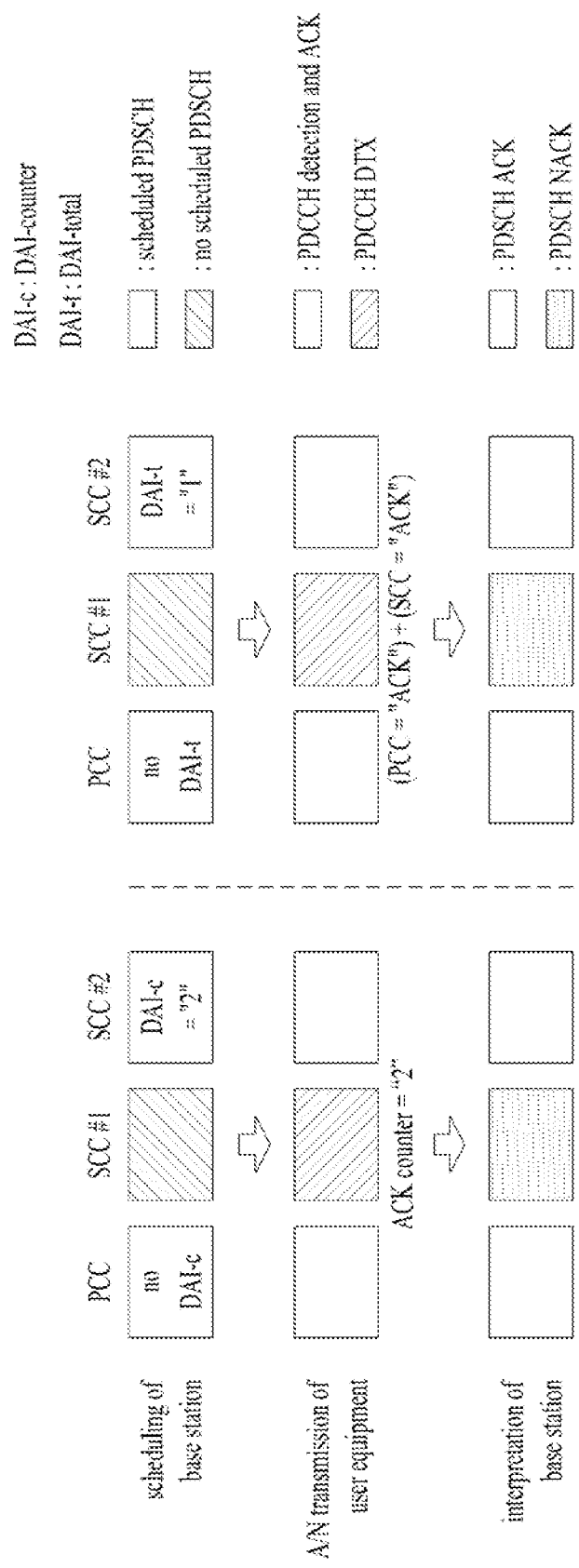

FIG. 18 illustrates an example of ACK/NACK transmission action for a CSI subframe. In this example, DL CC #1 (PCC) and DL CC #3 (SCC) are scheduled, and no DTX is generated.

Preferably, DAI signaling may be applied to the PDCCH (that is, SCC PDCCH) only, which schedules the PDSCH on the other DL CCs (that is, SCC) except for the DL CC (that is, PCC) linked to the UL CC, by using the TPC field, wherein the UL CC transmits CSI and/or A/N (that is, PUCCH). In this case, the TPC field within the PDCCH (that is, PCC PDCCH), which schedules the PDSCH on the PCC, is preferably used for PUCCH power control. Accordingly, the TPC field of the PCC PDCCH cannot be used to indicate the DAI value.

In this case, the DAI-counter (TPC field of SCC PDCCH) for the ACK counter is preferably set to include the PDSCH (or corresponding PDCCH) scheduled/transmitted to the PCC. For example, as shown in the left of FIG. 18, if the CC order is PCC, SCC #1, and SCC #2, and PCC and SCC #2 is scheduled, the DAI-counter value of SCC #2 may be signaled to 2. In this case, if the user equipment receives the PDSCH scheduled/transmitted to the PCC, it may recognize the DAI-counter value of the corresponding PDSCH (or corresponding PDCCH) as 1. In the meantime, in case of the PDSCH (that is, SPS PDSCH) scheduled in accordance with the SPS scheme, since the PDSCH is previously known by the user equipment and the base station, the SPS PDSCH may not be included when the DAI-counter value is set.

Also, the A/N bundling group may be divided into a PCC group and an SCC group, and the DAI-total (TPC field of SCC PDCCH) may be set to represent a value except for the PDSCH scheduled/transmitted to the PCC. For example, as shown in the right of FIG. 18, if PCC and SCC #2 of PCC, PCC and SCC #2 are scheduled, the DAI-total value of SCC #2 may be signaled to 1.

The method for transmitting uplink control information when ACK/NACK is transmitted for a CSI subframe has been described as above. However, the aforementioned method is only exemplary, and a similar status may occur when ACK/NACK is transmitted for a subframe (hereinafter, referred to as SR subframe) for SR transmission. In more detail, in the LTE-A system, if the ACK/NACK transmission timing point is overlapped with the SR transmission timing point (that is, SR subframe), it is considered that the ACK counter and A/N bundling scheme are applied to the plurality of kinds of ACK/NACK information and then ACK/NACK information compressed through symbol modulation is transmitted through SR PUCCH format/resource (for example, PUCCH format 1). Even in this case, it will be apparent that the aforementioned method may be used as it is. In other words, for the subframe for which the PDSCH corresponding to ACK/NACK to be transmitted through the SR subframe is scheduled, DAI for PDSCH scheduling for the corresponding subframe may be signaled using the TPC field within the PDCCH which schedules the PDSCH.

However, ACK/NACK information may be transmitted through the SR PUCCH format/resource in case of positive SR only during ACK/NACK information transmission for the SR subframe. In other words, if the SR subframe is negative SR, the ACK/NACK information may be transmitted through the PUCCH format 3/resource. Accordingly, for the subframe for which the PDSCH corresponding to ACK/NACK to be transmitted through the SR subframe is scheduled, a method for interpreting the TPC field within the PDCCH scheduling the PDSCH as DAI or ARI depending on positive SR/negative SR may be considered. However, since it does not know when the SR subframe is positive SR/negative SR, it is impossible to interpret the TPC field as DAI or ARI depending on positive SR/negative SR. Accordingly, for the subframe for which the PDSCH corresponding to ACK/NACK to be transmitted through the SR subframe is scheduled, it is preferable that the TPC field within the PDCCH scheduling the PDSCH is always interpreted as DAI and ARI value has a default value or a specific value previously set by higher layer if the SR subframe is negative SR.

In the same manner as the CSI subframe, the SR subframe is specified by subframe interval (that is, transmission period) and subframe offset, and may be configured by higher layer (for example, RRC) signaling. Also, the PUCCH resource for SR transmission may previously be set by higher layer (for example, RRC) signaling.

As described above, in order to manage ACK/NACK PUCCH resource (for example, PUCCH format 3 resource) while sharing the ACK/NACK PUCCH resource among a plurality of user equipments, the LTE-A system determines the PUCCH resource for ACK/NACK transmission by signaling ARI using the TPC field within the PDCCH (preferably, PDCCH that schedules the PDSCH on the SCC). At this time, when CSI (or positive SR) and ACK/NACK are transmitted at the same time through the CSI subframe (or SR subframe) by using the ACK counter, the A/N bundling scheme, or the other scheme, if the ACK/NACK is transmitted through CSI PUCCH resource (or SR PUCCH resource) not the ACK/NACK PUCCH resource, the ARI used to determine the ACK/NACK PUCCH resource is not required for the A/N-linked subframe. Accordingly, if the ACK/NACK is transmitted through the CSI PUCCH resource (or SR PUCCH resource) for the CSI subframe (or SR subframe), the TPC field within all the PDCCHs scheduling the PDSCH may be used for PUCCH power control without being used otherwise for the A/N-linked subframe. Preferably, all the TPC values of the TPC field within all the PDCCHs for the A/N-linked subframe may be set as the same values for robustness of UL power control, or may be set to have same signs. For another example, in case of the FDD system, the TPC value may independently be signaled per CC, and an accumulated sum of the TPC value per CC may be used as a final power value. For another example, in case of the TDD system, although the TPC value may independently be signaled per subframe, the same TPC value for all the CCs is signaled for the same subframe, and an accumulated sum of the TPC value per subframe may be used as a final power value.

Figure 19:
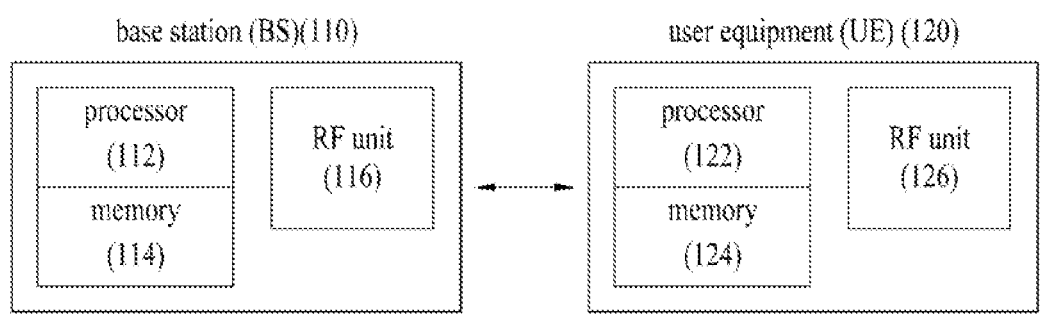
FIG. 19 is a diagram illustrating a base station and a user equipment, which can be applied to one embodiment of the present invention.

FIG. 19 is a diagram illustrating a base station and a user equipment, which can be applied to one embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 19, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a wireless communication device such as a user equipment, a relay and a base station.

The invention claimed is:
1. A method for transmitting an uplink signal from a communication device consisting of a plurality of cells in a frequency division duplex (FDD) wireless communication system, the method comprising the steps of:
receiving one or more physical downlink control channel (PDCCH) signals and one or more physical downlink shared channel (PDSCH) signals corresponding to the PDCCH signals in a downlink subframe N;
generating acknowledgement/negative acknowledgement (ACK/NACK) information on the basis of the result of receipt of at least the one or more PDSCH signals; and transmitting the ACK/NACK information through a PUCCH in an uplink subframe N+k where k is a positive integer, wherein, if a predetermined condition is satisfied, at least one of the one or more PDCCH signals includes information indicating a downlink assignment index (DAI) value, wherein, if the predetermined condition is not satisfied, at least one of the one or more PDCCH signals includes information indicating a value of a PUCCH resource for the ACK/NACK information, wherein the predetermined condition includes that the uplink subframe N+k is a subframe for channel state information (CSI) transmission or for scheduling request (SR) transmission, and wherein information indicating the DAI value and the information indicating the value of the PUCCH resource are provided through same field.

2. The method according to claim 1, wherein k is 4 when the uplink subframe N+k is the subframe for channel state information (CSI) transmission.

3. The method according to claim 1, wherein if the predetermined condition is satisfied, the ACK/NACK information includes an ACK counter result or ACK/NACK bundling result, and if the predetermined condition is not satisfied, the ACK/NACK information includes a result of individual receipt of each downlink signal.

4. The method according to claim 1, wherein the DAI value represents the order of corresponding PDCCHs or PDSCHs, or the number of scheduled PDCCHs or PDSCHs.

5. The method according to claim 1, wherein the information indicating the DAI value and the information indicating the value of the PUCCH resource are provided through a transmit power control (TPC) field.

6. A communication device configured to transmit an uplink signal in a state that a plurality of cells are configured in a frequency division duplex (FDD) wireless communication system, the communication device comprising:

a radio frequency (RF) unit; and
a processor,
wherein the processor receives one or more physical downlink control channel (PDCCH) signals and one or more physical downlink shared channel (PDSCH) signals corresponding to the PDCCH signals a in downlink subframe N, generates acknowledgement/negative acknowledgement (ACK/NACK) information on the basis of the result of receipt of at least the one or more PDSCH signal, and transmits the ACK/NACK information through a physical uplink control channel (PUCCH) when the uplink subframe N+k is the subframe, for channel state information (CSI) transmission, wherein, if a predetermined condition is satisfied, at least one of the one or more PDCCH signals includes information indicating a downlink assignment index (DAI) value, wherein, if the predetermined condition is not satisfied, at least one of the one or more PDCCH signals includes information indicating a value of a PUCCH resource for the ACK/NACK information, wherein the predetermined condition includes that the uplink subframe N+k is a subframe for channel state information (CSI) transmission or for scheduling request (SR) transmission, and wherein the information indicating the DAI value and the information indicating the value of the PUCCH resource are provided through same field.

7. The communication device according to claim 6, wherein k is 4 when the uplink subframe N+k is the subframe for channel state information (CSI) transmission.

8. The communication device according to claim 6, wherein if the predetermined condition is satisfied, the ACK/NACK information includes an ACK counter result or ACK/NACK bundling result, and if the predetermined condition is not satisfied, the ACK/NACK information includes a result of individual receipt of each downlink signal.

9. The communication device according to claim 6, wherein the DAI value represents the order of corresponding PDCCHs or PDSCHs, or the number of scheduled PDCCHs or PDSCHs.

10. The communication device according to claim 6, wherein the information indicating the DAI value and the information indicating the value of the PUCCH resource are provided through a transmit power control (TPC) field.

* * * * *